(12) United States Patent
Rejman

(10) Patent No.: US 9,379,561 B2
(45) Date of Patent: Jun. 28, 2016

(54) HAND TOOL ACCUMULATOR CHARGING DEVICE

(71) Applicant: Robert Bosch GmbH, Stuttgart (DE)

(72) Inventor: Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 13/724,443

(22) Filed: Dec. 21, 2012

(65) Prior Publication Data

US 2014/0035519 A1 Feb. 6, 2014

(30) Foreign Application Priority Data

Jul. 31, 2012 (DE) .......................... 10 2012 213 418

(51) Int. Cl.
*H02J 7/00* (2006.01)
*B25H 3/02* (2006.01)
*H02J 7/02* (2016.01)

(52) U.S. Cl.
CPC ................ *H02J 7/0044* (2013.01); *B25H 3/02* (2013.01); *H02J 7/025* (2013.01)

(58) Field of Classification Search
CPC .......... B25H 3/02; H02J 7/0044; H02J 7/025
See application file for complete search history.

(56) References Cited

U.S. PATENT DOCUMENTS

| | | | | |
|---|---|---|---|---|
| 4,045,720 A * | 8/1977 | Alexandres | ................... | 320/150 |
| 6,803,744 B1 * | 10/2004 | Sabo | ............................. | 320/108 |
| 7,462,951 B1 * | 12/2008 | Baarman | ........................ | 307/9.1 |
| 7,471,062 B2 * | 12/2008 | Bruning | ........................ | 320/108 |
| 7,835,534 B2 * | 11/2010 | Cole et al. | ...................... | 381/189 |
| 7,952,322 B2 * | 5/2011 | Partovi et al. | .................. | 320/108 |
| 8,228,026 B2 * | 7/2012 | Johnson et al. | ................ | 320/108 |
| 8,400,104 B2 * | 3/2013 | Adamczyk et al. | ........... | 320/108 |
| 8,890,478 B2 * | 11/2014 | Matthias et al. | .............. | 320/114 |
| 8,907,623 B2 * | 12/2014 | Saur | ............................... | 320/114 |
| 2007/0236174 A1 * | 10/2007 | Kaye | ............................. | 320/112 |
| 2009/0072782 A1 * | 3/2009 | Randall | ........................ | 320/107 |
| 2009/0212639 A1 * | 8/2009 | Johnson | ................. | H02J 5/005 307/104 |
| 2009/0212737 A1 * | 8/2009 | Johnson et al. | ............... | 320/108 |
| 2009/0237029 A1 * | 9/2009 | Andelfinger | .................. | 320/108 |
| 2009/0250364 A1 * | 10/2009 | Gerold et al. | ................. | 206/349 |
| 2010/0201201 A1 * | 8/2010 | Mobarhan et al. | ............ | 307/104 |
| 2010/0289341 A1 * | 11/2010 | Ozaki et al. | ................... | 307/104 |
| 2011/0241608 A1 * | 10/2011 | Adamczyk et al. | ........... | 320/108 |
| 2013/0021783 A1 * | 1/2013 | Vanko et al. | ................... | 362/119 |
| 2013/0181666 A1 * | 7/2013 | Matthias et al. | .............. | 320/108 |
| 2014/0151079 A1 * | 6/2014 | Furui et al. | ....................... | 173/46 |
| 2014/0327396 A1 * | 11/2014 | Rejman et al. | ................ | 320/108 |

* cited by examiner

*Primary Examiner* — Naum B Levin
(74) *Attorney, Agent, or Firm* — Norton Rose Fulbright US LLP

(57) ABSTRACT

A hand tool accumulator charging device is proposed having a charging device housing and a charging coil, provided for the purpose of charging a hand tool accumulator situated in an accumulator charging region, and having only one mounting device that is provided for the purpose of coupling with a hand tool case situated in a case receptacle region, the accumulator charging region and the case receptacle region being situated on sides of the charging device housing facing away from one another.

21 Claims, 2 Drawing Sheets

HAND TOOL ACCUMULATOR CHARGING DEVICE

RELATED APPLICATION INFORMATION

The present application claims priority to and the benefit of German patent application no. 10 2012 213 418.2, which was filed in Germany on Jul. 31, 2012, the disclosure of which is incorporated herein by reference.

This German application is related to earlier filed German patent application no. 10 2011 086 825.9 which was filed on Nov. 22, 2011 and for which priority is not being claimed.

BACKGROUND INFORMATION

A hand tool accumulator charging device having a charging coil has already been proposed.

SUMMARY OF THE INVENTION

A hand tool accumulator charging device having a charging device housing and a charging coil is proposed that is provided for the purpose of charging a hand tool accumulator situated in an accumulator charging region, and having only one mounting device that is provided for the purpose of coupling with a hand tool case situated in a case receptacle region, the accumulator charging region and the case receptacle region being situated on sides of the charging device housing facing away from one another. A "charging device housing" is to be understood in particular as an arrangement that, in a state ready for operation, mechanically connects at least the charging coil and the mounting device. The charging device housing may enclose an interior space in which there are advantageously situated a charging electronics system and in particular the charging coil of the hand tool accumulator charging device. In particular, a "charging coil" is to be understood as a coil that, during a charging process, receives and/or sends a quantity of energy. During a charging process the charging coil of the hand tool accumulator charging device may send a quantity of energy that charges the hand tool accumulator. In particular, the hand tool accumulator receives the energy. The charging coil may include at least a coil winding and in particular a coil core. Alternatively or in addition, the charging coil could be fashioned as an air-core coil. The charging coil may be configured as a printed conductor on a circuit board or, particularly as a wound coil. "Provided" is to be understood in particular as meaning specially programmed, designed, and/or equipped. An "accumulator charging region" is to be understood in particular as a region in which the hand tool accumulator is situated during a charging process. In particular, the charging coil is provided for the purpose of inductively transmitting a quantity of energy into the accumulator charging region.

The charging device housing may limit the accumulator charging region on, in particular, exactly one side. A "hand tool accumulator" is to be understood in particular as an accumulator that is provided for the purpose of supplying a quantity of energy to a hand tool. The hand tool accumulator may in particular be connected to the hand tool so as to be releasable without the use of tools. Alternatively or in addition, a hand tool accumulator may be integrated in the hand tool. A "hand tool" is to be understood in particular as a portable tool whose use appears rational to someone skilled in the art, advantageously however a drill, a drill hammer, an impact hammer, a saw, a planer, a screwdriver, a miller, a grinder, an angle grinder, a garden tool, a construction site measuring device, and/or a multifunctional tool. "Charging" is to be understood in particular as meaning that the hand tool accumulator chemically stores a quantity of electrical energy. A "case receptacle region" is to be understood in particular as a region in which the hand tool case is situated when the mounting device fastens the hand tool case to the charging device housing.

The charging device housing may limit the case receptacle region at at least one side. A "hand tool case" is to be understood in particular as a case that, in a closed state, limits a tool receptacle region so as to be protected against impacts, against moisture, and/or against dust. The hand tool case may limit the tool receptacle region at least partly in the form of a hand tool accumulator. The hand tool case may have at least one fastening device for fastening a hand tool, a hand tool having a connected hand tool accumulator, and/or, particularly, a hand tool accumulator. The hand tool case may be magnetic and/or may be advantageously electrically passive. In particular, the hand tool case does not have an electrical system. Alternatively or in addition, the hand tool case could have a charging coil and/or, advantageously, a magnetic field conductor that receives the energy and conveys it to a hand tool accumulator in wire-bound fashion and/or magnetically. The hand tool case may be fashioned in a manner corresponding to the hand tool case proposed in DE 10 2008 058 007 B3. A "mounting device" is to be understood in particular as a device that, in at least one operating state, produces a mechanically solid connection between two units. The mounting device may be provided for the purpose of fastening the hand tool case to the charging device housing. In particular, the mounting device is provided for the purpose of fastening precisely one hand tool case at a particular time. "Coupling" is to be understood in particular as meaning that the mounting device and the hand tool case are fashioned such that they can be fastened to one another without the use of an additional arrangement. The expression "situated on sides facing away from one another" is to be understood in particular as meaning that a main plane of extension of a surface of the charging device housing that limits the accumulator charging region and a main plane of extension of a surface of the charging device housing that limits the case receptacle region enclose a minimum angle of between 90° and 180°, advantageously between 135° and 180°. A "main plane of extension" of a surface is to be understood in particular as a plane having a least total deviation from the surface. Through the design according to the present invention of the hand tool accumulator charging device, a flat constructive form can advantageously be achieved.

In a further embodiment, it is proposed that the charging device housing limits the accumulator charging region with a surface that is essentially planar, making possible a particularly simple manufacture and a particularly flat constructive form. The expression "limits with a surface that is essentially planar" is to be understood in particular as meaning that the surface deviates from a main plane of extension of the surface by less than 20 mm, advantageously less than 10 mm. A plane spanned by the planar surface may limit the hand tool accumulator charging device in the direction of action of the charging coil. This means in particular that no component of the hand tool accumulator charging device extends, in the direction of action, past the plane spanned by the planar surface.

In addition, it is proposed that the mounting device be fashioned so as to be releasable by an operator without the use of tools, enabling particularly convenient operation. The term "releasable" is to be understood in particular as meaning that the hand tool accumulator charging device fastens the hand tool case in a state, and in a different state this fastening can be separated by an operator without destruction, and/or reversibly. The expression "releasable by an operator without the use of tools" is to be understood in particular as meaning that a connection of the mounting device is fashioned so as to be manually releasable by an operator. The mounting device may have at least one operating element that releases a fastening when actuated by an operator.

In addition, it is proposed that the mounting device have at least one mounting arrangement that is provided to lock the hand tool case, making possible, in a constructively simple manner, a particularly stable, user-friendly, and in particular automatically closing fastening. A "mounting arrangement" is to be understood in particular as an arrangement that in at least one operating state exerts a force directly on the tool case for the purpose of fastening the tool case. The mounting arrangement may be fashioned corresponding to, and/or according to, a mounting arrangement proposed in DE 10 2008 058 007 B3. The term "lock" is to be understood in particular as meaning that during a fastening process of the hand tool case a mounting arrangement is elastically deflected so that it subsequently hooks in behind a corresponding mounting arrangement due to a force acting on the mounting arrangement.

In addition, it is proposed that the mounting device have two mounting arrangement that are situated on two sides situated opposite one another of the case receptacle region, making possible a particularly reliable fastening in a constructively simple fashion. The expression "on two sides situated opposite one another" is to be understood in particular as meaning that the mounting arrangement is situated on a straight line that intersects the case receptacle region and that is oriented at least essentially parallel to one side of the case receptacle region.

In addition, it is proposed that the hand tool accumulator charging device include a charging electronics system that is provided for the purpose of at least controlling a charging process, so that a particularly advantageous charging process can be achieved. The term "charging electronics system" is to be understood in particular as meaning an electronics system that monitors a charging state at least of a hand tool accumulator and, as a function thereof, controls and/or may regulates a charging process of the hand tool accumulator.

In an advantageous embodiment of the present invention, it is proposed that the hand tool accumulator charging device have at least one further charging coil, by which a plurality of hand tool accumulators can be charged simultaneously.

In addition, it is proposed that a main plane of extension of the charging device housing be oriented essentially perpendicular to a direction of action of the charging coil, so that a particularly small constructive size can be achieved. A "main plane of extension of the charging device housing" is to be understood in particular as a plane in which the charging device housing has a maximum extension and that may be oriented parallel to an outer side of the charging device housing. The main extension may be oriented parallel to an outer side of the charging device housing that faces the case receptacle region. A "direction of action" is to be understood in particular as a direction in which the charging coil transmits a quantity of energy during a charging process.

Further advantages result from the following description of the drawing. The drawing shows an exemplary embodiment of the present invention. The drawing, the description, and the claims contain numerous features in combination. A person skilled in the art will usefully also consider the features individually and combine them to form rational further combinations.

DETAILED DESCRIPTION

Figure 1:
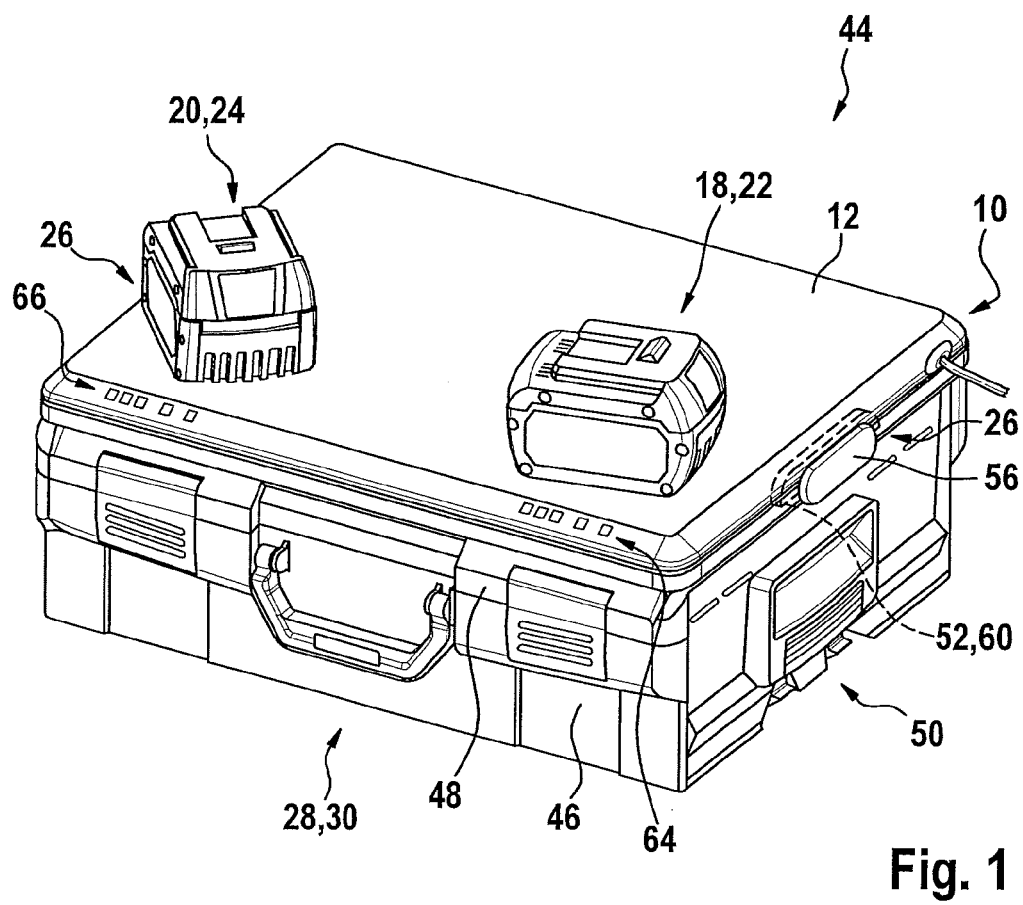
FIG. 1 shows a system having a hand tool accumulator charging device according to the present invention, a hand tool case, and two hand tool accumulators, in a perspective representation.

FIG. 1 shows a system 44 having a hand tool accumulator charging device 10 according to the present invention, two hand tool accumulators 22, 24, and a hand tool case 30. Hand tool case 30 includes a base body 46, a case cover 48, a first mounting device 50, and a second mounting device 52. When case cover 48 is closed, base body 46 and case cover 48 limit a tool receptacle space. First mounting device 50 is provided for the purpose of fastening an additional hand tool case (not shown in more detail) on a side of base body 46 facing away from case cover 48. Second mounting device 52 is provided for the purpose of fastening hand tool accumulator charging device 10, or the hand tool case not shown in more detail, on a side of case cover 48 essentially facing away from base body 46. First mounting device 50 and second mounting device 52 are fashioned so as to correspond one another. During a charging process, hand tool accumulators 22, 24 are placed onto a surface 32a of hand tool accumulator charging device 10. Alternatively or in addition, a hand tool accumulator charging device could be provided for fastening a hand tool accumulator during a charging process.

Figure 2:
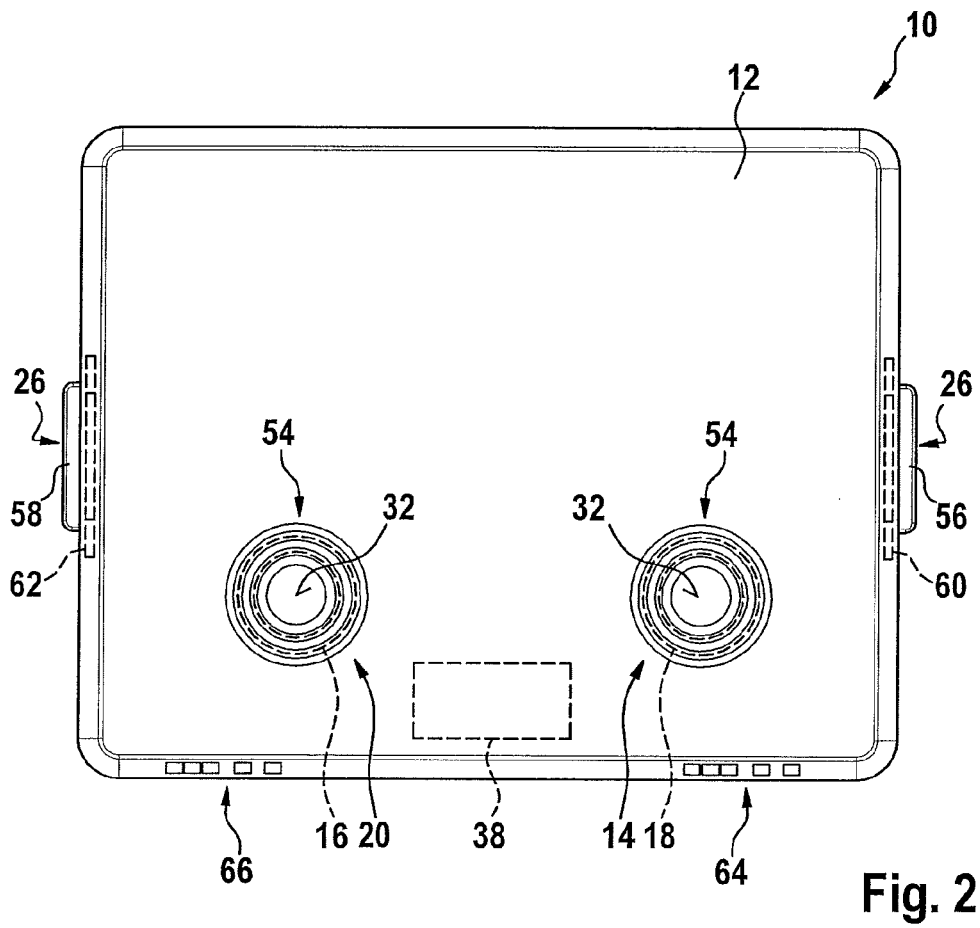
FIG. 2 shows the hand tool accumulator charging device of FIG. 1 in a top view.
Figure 3:
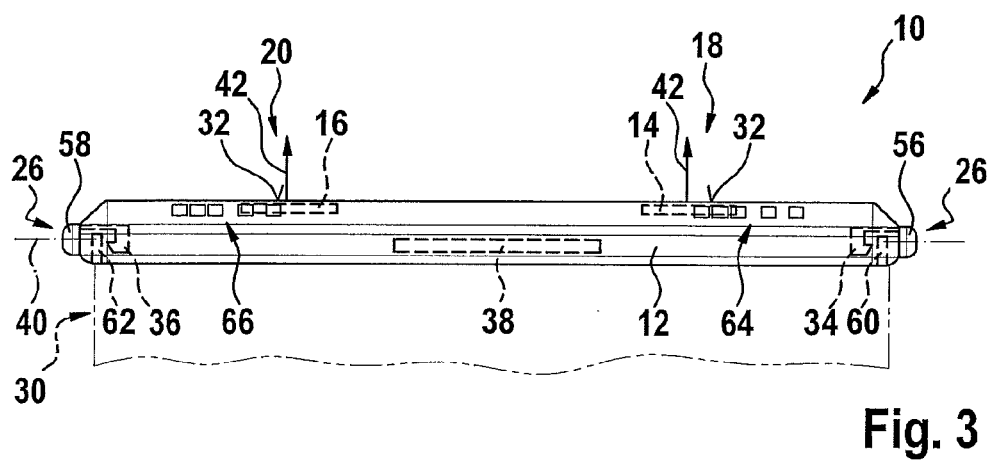
FIG. 3 shows the hand tool accumulator charging device of FIG. 1 in a side view.

FIGS. 2 and 3 show hand tool accumulator charging device 10. Hand tool accumulator charging device 10 has a charging device housing 12, two charging coils 14, 16, and a mounting device 26. Charging coils 14, 16 are provided for the purpose of charging a hand tool accumulator 22, 24 situated in an accumulator charging region 18, 20. For this purpose, charging coils 14, 16 convert a quantity of electrical power into inductive power. Charging coils 14, 16 transmit the inductive power through surface 32 of charging device housing 12 into hand tool accumulators 22, 24. Hand tool accumulators 22, 24 each have a charging coil (not shown in more detail) that converts the inductive power back into electrical power. Charging device housing 12 limits accumulator charging region 18, 20 with a surface 32 that is essentially planar. Charging device housing 12 has markings 54 that indicate to an operator a position of accumulator charging regions 18, 20. A main plane of extension 40 of charging device housing 12 is oriented essentially perpendicular to a direction of action 42 of charging coils 14, 16.

Mounting device 26 is provided for the purpose of coupling with exactly one hand tool case 30 situated in a case receptacle region 28 of hand tool accumulator charging device 10. For this purpose, mounting device 26 has two mounting arrangements 34, 36, shown schematically in FIG. 3. Mounting arrangements 34, 36 have locking hooks that are provided for the locking of hand tool case 30. Mounting arrangements 34, 36 are movably mounted against a spring (not shown in more detail) via operating elements 56, 58 of mounting device 26. In a coupled operating state, second mounting device 52 of hand tool case 30 is situated in two coupling openings 60, 62 of charging device housing 12a. Mounting arrangements 34, 36 of hand tool accumulator charging device 10 engage in locking openings of second mounting device 52 of hand tool case 30. Mounting arrangement 34, 36 of hand tool accumulator charging device 10 are situated on two sides situated opposite one another of case receptacle region 28. In this way, mounting device 26 of hand tool accumulator charging device 10 is fashioned so as to be releasable by an operator without using tools. Second mounting device 50 of hand tool case 30 and mounting device 52 of hand tool accumulator charging device 10 are fashioned so as to correspond to one another. Accumulator charging regions 18, 20 and case receptacle region 28 are situated on sides facing away from one another of charging device housing 12, these sides being opposite one another.

Hand tool accumulator charging device 10 has a charging electronics system 38 that is provided for the purpose of regulating a charging process. Charging electronics system 38 converts a voltage of an energy input into voltages for operating charging coils 14, 16. Hand tool accumulator charging device 10 includes two display devices 64, 66 that indicate to an operator a state of charge of hand tool accumulator 22, 24 and a quality of a positioning of hand tool accumulator 22, 24 for a charging process.

What is claimed is:

1. A hand tool accumulator charging device, comprising:
    a charging device housing having an accumulator charging region and a case receptacle region for receiving a hand tool case;
    a charging coil for charging a hand tool accumulator situated in the accumulator charging region, the charging coil being disposed in the charging device housing; and
    one mounting device for coupling with a hand tool case situated in the case receptacle region, the mounting device being disposed on the charging device housing;
    wherein the case receptacle region is located on a side of the charging device housing that is different from, and faces away from, a side of the charging device housing at which the accumulator charging region is located,
    wherein the accumulator charging region is external to the hand tool case.

2. The hand tool accumulator charging device of claim 1, wherein the charging device housing limits the accumulator charging region with a surface that is essentially planar.

3. The hand tool accumulator charging device of claim 2, wherein the mounting device is configured so as to be releasable by an operator without the use of tools.

4. The hand tool accumulator charging device of claim 1, wherein the mounting device is configured so as to be releasable by an operator without the use of tools.

5. The hand tool accumulator charging device of claim 1, wherein the mounting device has at least one mounting arrangement that is provided for the purpose of locking the hand tool case.

6. The hand tool accumulator charging device of claim 1, wherein the mounting device has two mounting arrangements that are situated on two sides of the case receptacle region situated opposite one another.

7. The hand tool accumulator charging device of claim 1, further comprising:
    a charging electronics system for at least controlling a charging process.

8. The hand tool accumulator charging device of claim 1, further comprising:
    at least one additional charging coil.

9. The hand tool accumulator charging device of claim 1, wherein a main plane of extension of the charging device housing is oriented essentially perpendicular to a direction of action of the charging coil.

10. The hand tool accumulator charging device of claim 1, wherein the charging device housing is configured to mechanically connect at least the charging coil and the mounting device.

11. The hand tool accumulator charging device of claim 1, wherein the charging device housing encloses an interior space which includes the charging coil and a charging electronics arrangement.

12. The hand tool accumulator charging device of claim 1, wherein the charging device housing delimits the accumulator charging region at least on one side.

13. The hand tool accumulator charging device of claim 1, wherein the charging device housing delimits the case receptacle region at least on one side.

14. The hand tool accumulator charging device of claim 1, wherein the charging device housing is embodied as a substantially flat housing having a main plane of extension, the side at which the case receptacle region is located and the side at which the accumulator charging region is located being arranged substantially parallel to one another along the main plane of extension.

15. The hand tool accumulator charging device of claim 1, wherein the side of the charging device housing at which the case receptacle region is located and the side of the charging device housing at which the accumulator charging region is located are arranged opposite to one another on the charging device housing.

16. The hand tool accumulator charging device of claim 1, wherein the mounting device includes a mounting arrangement having a locking element configured to lock the hand tool case releasably.

17. The hand tool accumulator charging device of claim 16, wherein the mounting device includes an operating element for manually operating the mounting arrangement.

18. A system, comprising:
    a hand tool case; and
    a hand tool accumulator charging device, including:
        a charging device housing having an accumulator charging region and a case receptacle region for receiving the hand tool case;
        a charging coil for charging a hand tool accumulator situated in an accumulator charging region, the charging coil being disposed in the charging device housing; and
        one mounting device for coupling with a hand tool case situated in the case receptacle region, the mounting device being disposed on the charging device housing, the accumulator charging region and the case receptacle region being situated on sides of the charging device housing facing away from one another and which are different from one another,
        wherein the accumulator charging region is external to the hand tool case.

19. The system of claim 18, wherein the hand tool case includes a base body and a case cover, the base body and the case cover being configured to delimit a receptacle space for at least one hand tool.

20. A system, comprising:
    a hand tool accumulator; and
    a hand tool accumulator charging device, including:
        a charging device housing having an accumulator charging region and a case receptacle region for receiving a hand tool case;
        a charging coil for charging the hand tool accumulator situated in an accumulator charging region, the charging coil being disposed in the charging device housing; and one mounting device for coupling with the hand tool case situated in the case receptacle region, the mounting device being disposed on the charging device housing, the accumulator charging region and the case receptacle region being situated on sides of the charging device housing facing away from one another and which are different from one another, wherein the accumulator charging region is external to the hand tool case.

21. The system of claim 20, wherein the hand tool accumulator is configured to be releasably connected to a hand tool and supply power to the hand tool.

\* \* \* \* \*